United States Patent [19]

Ditzig et al.

[11] Patent Number: 5,617,474
[45] Date of Patent: *Apr. 1, 1997

[54] TELEPHONE HANDSET HAVING A LATCH-RECEIVING OPENING IN AN ENLARGED INLET OPENING OF A CARD-RECEIVING SLOT

[75] Inventors: Albert Ditzig, Hoffman Estates; Jerome L. Oldani, Aurora, both of Ill.

[73] Assignee: The Goeken Group Corporation, Oakbrook, Ill.

[*] Notice: The term of this patent shall not extend beyond the expiration date of Pat. No. 5,173,936.

[21] Appl. No.: 520,404

[22] Filed: May 8, 1990

[51] Int. Cl.⁶ .................................................. H04Q 7/00
[52] U.S. Cl. ......................... 379/433; 379/56; 379/58; 379/61; 379/144
[58] Field of Search .................. 379/53, 58, 61, 379/62, 63, 91, 96, 110, 143, 144, 370, 419, 428, 433, 453, 455, 56, 368; D14/138, 144, 147, 148, 240, 251; 455/90

[56] References Cited

U.S. PATENT DOCUMENTS

| | | | |
|---|---|---|---|
| D. 276,723 | 12/1984 | Marshall | D14/147 |
| D. 280,986 | 10/1985 | Kao | D14/147 |
| D. 297,837 | 9/1988 | Shibuya et al. | D14/240 |
| D. 299,136 | 12/1988 | Taylor | D14/148 |
| D. 299,137 | 12/1988 | Soren et al. | D14/148 |
| D. 301,034 | 5/1989 | Fujita et al. | D14/138 |
| 4,481,382 | 11/1984 | Villa-Real | 379/61 |
| 4,488,009 | 12/1984 | Sherman | 379/370 |
| 4,587,379 | 5/1986 | Masuda | 379/91 |
| 4,646,344 | 2/1987 | Goldhora et al. | 379/58 |
| 4,661,659 | 4/1987 | Nishimura | 379/61 |
| 4,672,661 | 6/1987 | Clark, Jr. et al. | 379/144 |
| 4,727,569 | 2/1988 | Kutrieb et al. | 379/58 |
| 4,776,000 | 10/1988 | Parienti | 379/62 |
| 4,788,420 | 11/1988 | Chahg et al. | 379/91 |
| 4,811,387 | 3/1989 | Hollewed | 379/144 |
| 4,829,561 | 5/1989 | Matheny | 379/144 |
| 4,850,009 | 7/1989 | Zook et al. | 379/96 |
| 4,860,336 | 8/1989 | D'Auello et al. | 379/63 |
| 4,868,846 | 9/1989 | Kemppi | 379/144 |
| 4,991,197 | 2/1991 | Morris | 379/58 |
| 5,109,412 | 4/1992 | Hollowed et al. | 379/455 |
| 5,128,993 | 7/1992 | Skowronski | 379/438 |
| 5,173,936 | 12/1992 | Ditzig et al. | 379/440 |

FOREIGN PATENT DOCUMENTS

| | | | |
|---|---|---|---|
| 0276403 | 8/1988 | European Pat. Off. | 379/58 |
| 0281728 | 9/1988 | European Pat. Off. | 379/56 |
| 0006544 | 1/1981 | Japan | 379/368 |
| 0296551 | 12/1988 | Japan | 379/110 |
| 0078059 | 3/1989 | Japan | 379/110 |
| 0085457 | 3/1989 | Japan | 379/433 |

OTHER PUBLICATIONS

Motorola, "DYNA TAC Cellular Mobile Telephone", Mechanical Parts, Aug. 31, 1983.
Wagenleehner, "Mobile Telephone Made Easy", Telcom Report #10.4, 1987.
Radio Shack, "1990 Catalog", pp. 78–85, 1989.
Motorola, "Your Portable Connection", 1989.
Communication Manufacture Company, "Trub–L–Shooter" Dec. 12, 1970.
Radio Shack, "1988 Catalog #419", pp. 78–88.

Primary Examiner—William Cumming
Attorney, Agent, or Firm—Hill, Steadman & Simpson

[57] ABSTRACT

A convenient versatile telephone handset has one set of telephone activating keys and another set of computer control keys. The special telephone handset can also have a card-receiving slot and a recessed mouthpiece. Advantageously, the flexible telephone handset is particularly useful for business travelers in airplanes, trains, and buses to link up to reservation systems and other data bases.

9 Claims, 4 Drawing Sheets

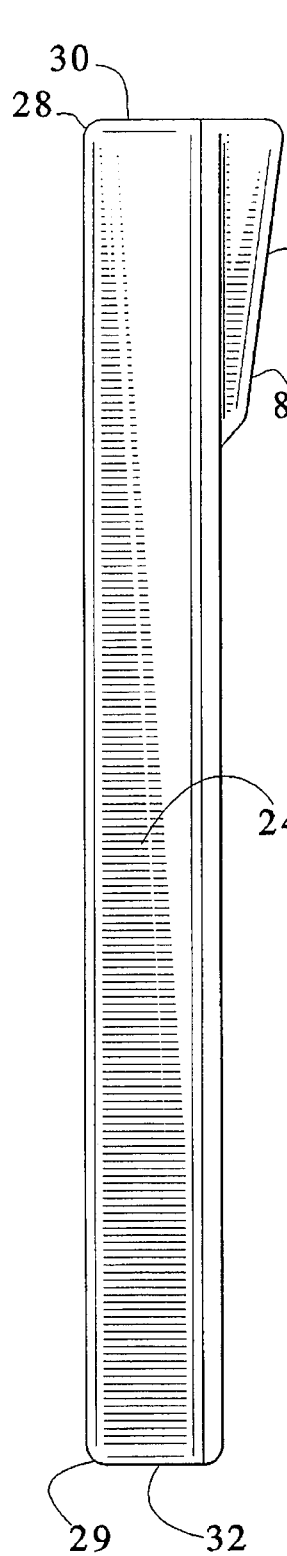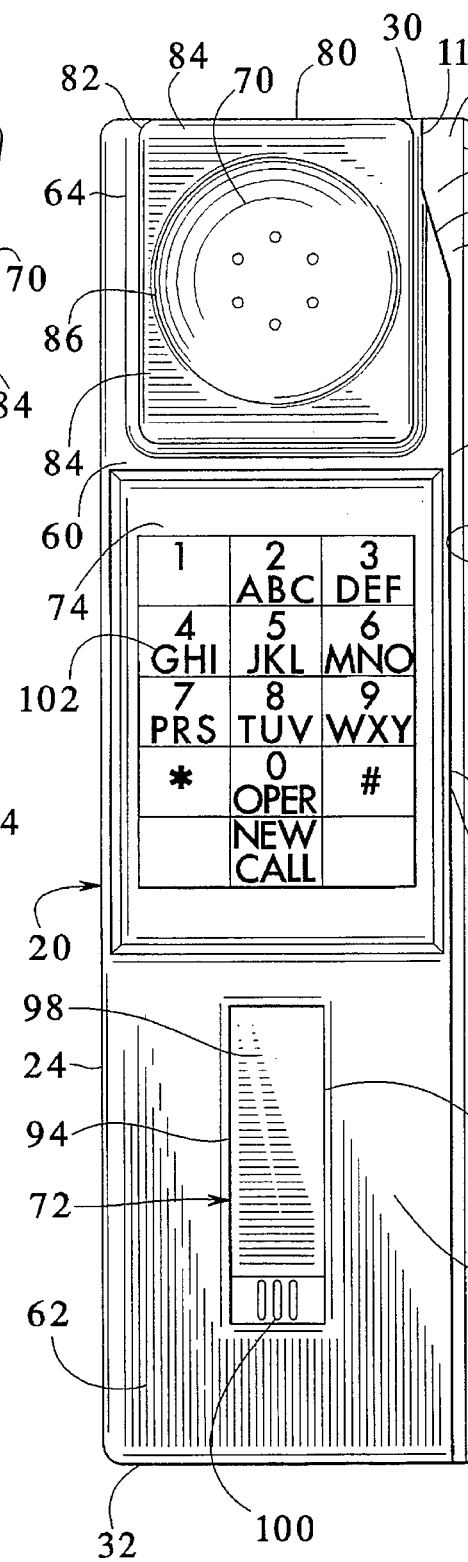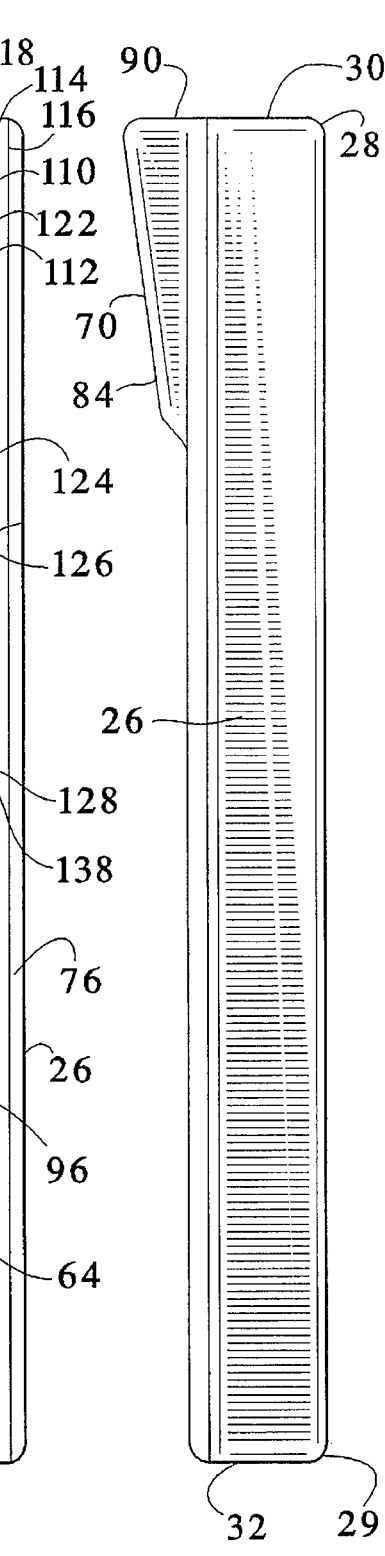

TELEPHONE HANDSET HAVING A LATCH-RECEIVING OPENING IN AN ENLARGED INLET OPENING OF A CARD-RECEIVING SLOT

BACKGROUND OF THE INVENTION

This invention relates to telephones and, more particularly, to telephone handsets.

Telephone construction, operation, and design have changed dramatically since the invention of the telephone by Alexander Graham Bell in U.S. Pat. No. 174,465. Early telephones were cumbersome, crank operated and utilized a separate earpiece connected by a cord to stationary telephone box. The telephone box was mounted on a wall and had a speaker cone providing a mouthpiece. In the 1950s, black bulky telephones were in use with a stationary base on which was mounted a rotatable dial. A movable handset with an earpiece and mouthpiece was connected by a cord to the stationary base. In the 1980s, lighter weight white and colored handsets were developed with pushbuttons between the earpiece and mouthpiece or with pushbuttons on the base. Pushbutton telephones have generally replaced rotary telephones.

Pay telephones or telephone pay station included several slots for the deposit of coins of varying denominations. A typical arrangement allowed the deposit of nickels, dimes and quarters so that payment of various amounts could be utilized in connection with the pay station. This arrangement was first used with manual telephones in which the initial deposit of a single coin would signal the operator that a call was to be placed. Additional coins were added for payment of calls to long distance locations. Internal arrangements of gongs transmitted various sounds back to the operator and gave the operator an indication of proper coin deposit. Eventually, telephone pay stations became dial operated, and an operator would normally not be required in order to place local calls. Various arrangements for actuating the equipment and for accepting and returning coins were developed, including electronic totalizers that were able to count and accurately register the number and denomination of coins deposited. Such totalizers also facilitated the development and utilization of single slot pay stations in which a single slot accepted coins of various denominations.

Some coin operated telephones and public telephones were developed with a slot or card swipe to receive a telephone identification credit card, or other card with a magnetic strip to enable the user to make calls without the need for cash/coins, by charging the telephone call to the user's account. Telephones that accept credit cards represent a much more recent development that has found widespread use. Pay telephones that accept credit cards are sometimes found in airports, railroad stations, etc., and have been well received by travelers.

Recent development and adaptation of the pay station have permitted use in commercial aircraft. Credit card-accepting pay stations have been incorporated into commercial aircraft where, by means of radio-telephone links, telephone service can be made by the user from the commercial aircraft to ground-based telephone equipment. Aircraft telephones themselves have typically been installed on bulkheads located adjacent to flight-attendant stations. This arrangement requires the user to leave the passenger seat to go to the location of the on board pay station to initiate the call. If the pay station is equipped with a wireless telephone unit, the flight attendant often becomes involved in providing the user with the hand-held telephone.

Wireless aircraft telephones have been provided with a credit card and reader. In this type of system, the user has to walk to the phone station, insert and leave the credit card in the handset mount to release the handset, then carry the handset back to the passengers seat, and after use, replace the handset and retrieve the credit card. However, with this type of system the passenger cannot obtain the handset during turbulence or at other times when passengers are required to remain in their seats. Furthermore, it is inconvenient to obtain a handset during the time meals are being served and in particular when ones seat is not located on the aisle. Such arrangements fail to afford the convenience and safety, an aircraft passenger might desire in connection with the placement of a call.

In the 1980s, personal computers (PCs) were mass produced for businessmen, word processing personnel, financial analysts, bankers, and other consumers. Such personal computers were generally more compact then their predecessors, had greater memory capabilities, and faster processing times. Lap top computers and other portable computers were also produced. Computers can be hooked up with data bases and other computers at distant or remote locations via a modem.

Over the years a variety of telephone handsets and other telecommunication equipment have been suggested. Typifying these prior art telephone handsets and telecommunication equipment are those shown in U.S. Pat. Nos. 2,557, 393; 4,252,992; 4,488,009; 4,587,379; 4,661,659; 4,672, 661; 4,727,569; 4,788,420; 4,811,387; U.S. Pat. No. Design 276,723; U.S. Pat. No. Design 280,986; U.S. Pat. No. Design 297,839; U.S. Pat. No. Design 299,136; U.S. Pat. No. Design 299,137; and U.S. Pat. No. Design 301,034. These prior art telephone handsets and telecommunication equipment have met with varying degrees of success.

It is, therefore, desirable to provide a telephone handset with improved features which can also control a display screen of a computer terminal.

SUMMARY OF THE INVENTION

An improved telephone handset is provided which can be used for many purposes, but is particularly useful for travelers in airplanes, trains, ships, and buses to link up with reservation systems, other data base systems, or their office. Advantageously, the novel telephone handset is versatile, comfortable, and efficient. It is also compact, dependable, and effective.

To this end, the novel telephone handset has two sets of control keys, key pads, and/or push buttons. One set activates telephone numbers and the other set activates, controls, and/or signals a display screen of a computer or other central processing unit. One set can be on the front and the other set can be on the back of the telephone handset. In the preferred form, the telephone activating set is positioned on the front of the telephone handset between the earpiece and mouthpiece, and the computer control set is located on the back of the telephone handset.

The improved telephone handset also has a card-receiving slot, located either on the back or preferably the front of the telephone handset, to receive an identification card or credit card with a magnetic strip thereon. Desirably, the slot has an enlarged inlet opening providing a mouth with diverging lips or at least one flared, slanted inclined side. In the preferred form, the mouth is located in proximity to the top of the telephone handset and is adjacent one of the sidewalls of the handset. The bottom of the telephone handset can have a cord-receiving opening, adjacent the other of said sidewalls to provide a port or socket to receive a plug or connector of a telephone cord.

The universal telephone handset can also have a recessed mouthpiece for enhanced acoustical transmission. In the preferred form, the recessed mouthpiece has triangular sides and an inclined ramp which slopes downwardly and away from said earpiece towards the bottom of the telephone handset.

A more detailed explanation of the invention is provided in the following description and claims taken in conjunction with the accompanying drawings.

BRIEF DESCRIPTION OF THE DRAWINGS

FIG. 2 is a front view of the telephone handset;

FIG. 3 is a left side view of the telephone handset;

FIG. 4 is a right side view of the telephone handset;

DETAILED DESCRIPTION OF THE PREFERRED EMBODIMENTS

A universal telephone and computer control handset 20 (FIGS. 1–7) is provided which is light weight, compact, and user friendly. Advantageously, the flexible handset 20 has excellent market appeal, is convenient, and attractive to businessmen, travelers, and others.

The handset 20 has an elongated separable housing 22 which can be molded out of impact-resistant plastic and can comprise two or more separable parts separated by a parting line for access into the interior of the handset. Other materials can be used.

Figure 5:
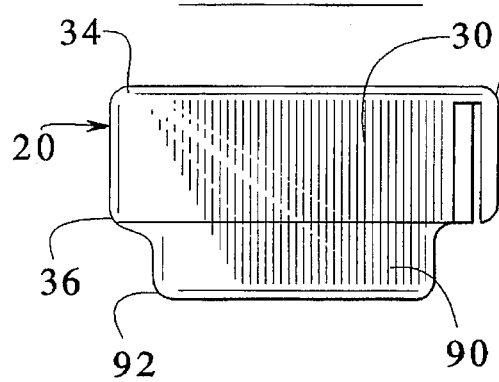
FIG. 5 is a top view of the telephone handset.
Figure 6:
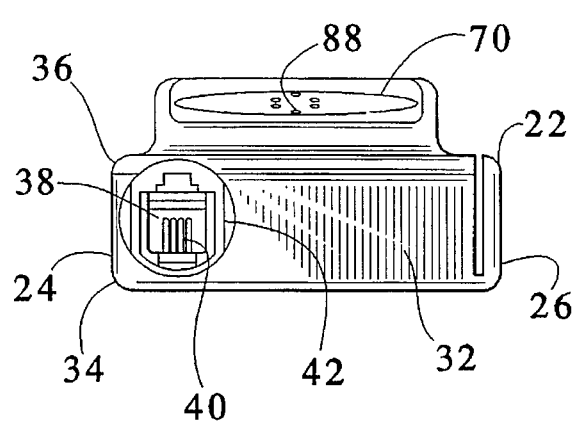
FIG. 6 is a bottom view of the telephone handset.
Figure 7:
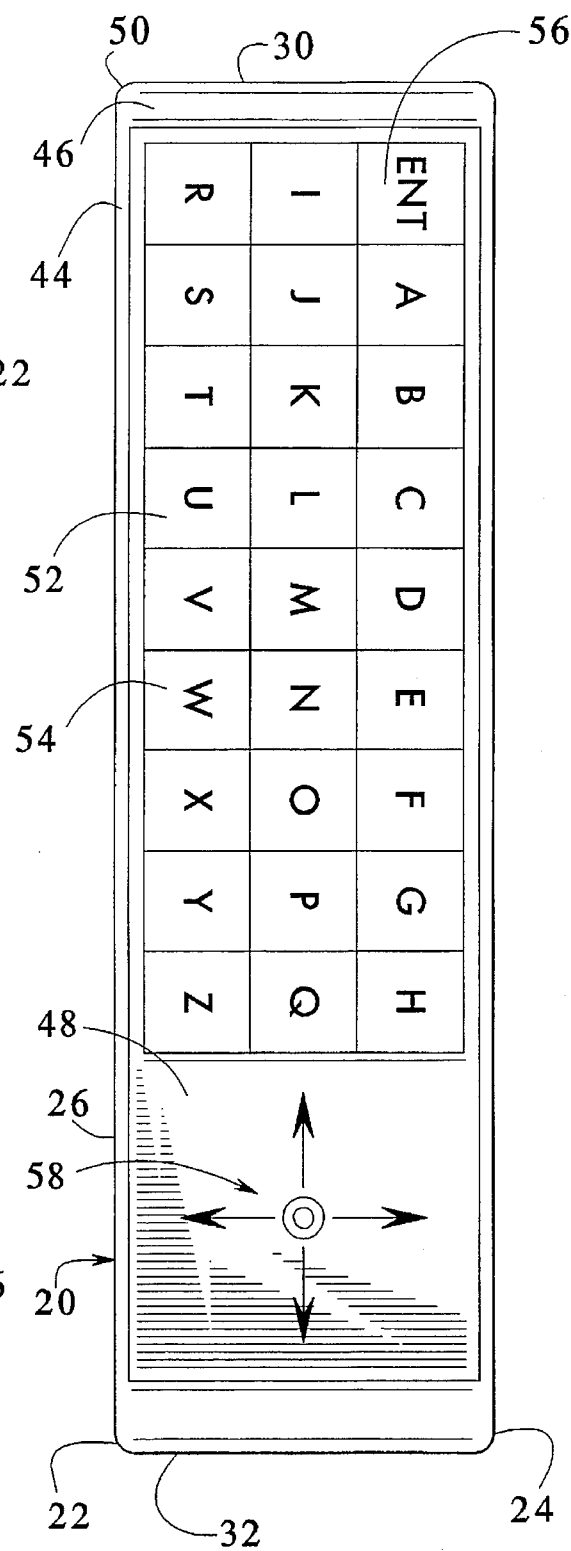
FIG. 7 is a back view of the telephone handset.

The housing 22 of the handset 20 has substantially planar or flat, upright sidewalls 24 and 26 including a left sidewall 24 (FIG. 3) and a right sidewall 26 (FIG. 4). The sidewalls 24 and 26 are parallel and generally rectangular with rounded corners 28 and 29 (FIGS. 2 and 4). The housing 22 of the handset 20 also has upright end walls 30 and 32 as best shown in FIGS. 5–7. The ends walls include a substantially imperforate top wall 30 (FIG. 5) providing the top of the handset and a bottom wall 32 (FIG. 6) providing the bottom of the handset. The ends walls are parallel, substantially planar or flat, and are generally rectangular with rounded corners 34 and 36.

The bottom wall 32 (FIG. 6) has a cord-receiving opening 38 in proximity to the left sidewall 24. The cord-receiving opening 38 provides a port or socket to receive a plug 40, adapter, and/or connector 42, such as a swivel style connector sold under the Trademark and brand name UNTANGLER by Telephone Products, Inc., attached to a telephone cord.

The housing 22 of the handset 20 has a back rearward wall 44 (FIG. 7) with a back rearwardly facing surface 46 which provides the back of the handset. The back wall and surface extends horizontally between and connects the end walls 30 and 32 to the sidewalls 24 and 26. The back surface 46 has substantially planar or flat peripheral portions 48 and is generally rectangular with rounded corners 50. The back of the handset has an array, set, and series of finger engagable, computer control keys 52 to remotely control, activate, and signal a central process unit such as a computer with a display screen. In the embodiment of FIG. 7, the computer control keys 52 comprise three columns of alpha, rectangular depressible resilient, key pads 54 in the English alphabet. Each of the columns are sequentially and progressively arranged in increasing order of the alphabet from top 30 to bottom 32 with an enter (ENT) control input key 56. The computer control keys 52 can also include arrow cursor keys 58 to move a cursor in the direction of the arrow on the display screen of a computer. For ease of use of the computer control keys 52, the handset 20 can be turned sideways and laterally 90 degrees or to some other desired position. Key pads using numbers and upper and lower case letters can also be used. The interior facing portions of the key pads 54 are electrically connected to a computer actuated electrical system within the interior of the handset and/or having switches, wires, and/or a circuit board or computer chip, etc. While the illustrated computer control keys are preferred for best results, other arrangements, orientation, pattern, number, shapes, or location of the computer control keys can be used, if desired, and foreign language letters and/or numbers can be used in other countries, if desired.

The housing 22 of the handset 20 has a front wall or front 60 (FIG. 2) with a front forwardly facing surface 62 which provides the front of the handset. The front wall and surface extends between and connects the end walls 30 and 32 to the sidewalls 24 and 26. As shown in FIGS. 3 and 4, the front surface 62 has substantially planar or flat portions 64 which are positioned substantially parallel to the back portion 48 of the back 46 of the handset 20. The front surface 62 is generally rectangular as viewed from the front with rounded corners 66.

The front wall 60 (FIGS. 1 and 2) of the handset 20 has an earpiece 70 adjacent the top 30 of the handset, a mouthpiece 72 in proximity to the bottom 32 of the handset, and an intermediate control section 74 positioned between the earpiece 70 and the mouthpiece 72. The front wall 60 has an elongated card-receiving slot 76 or swipe to receive the lower portions of an identification card or credit card with a magnetic strip thereon.

Figure 1:
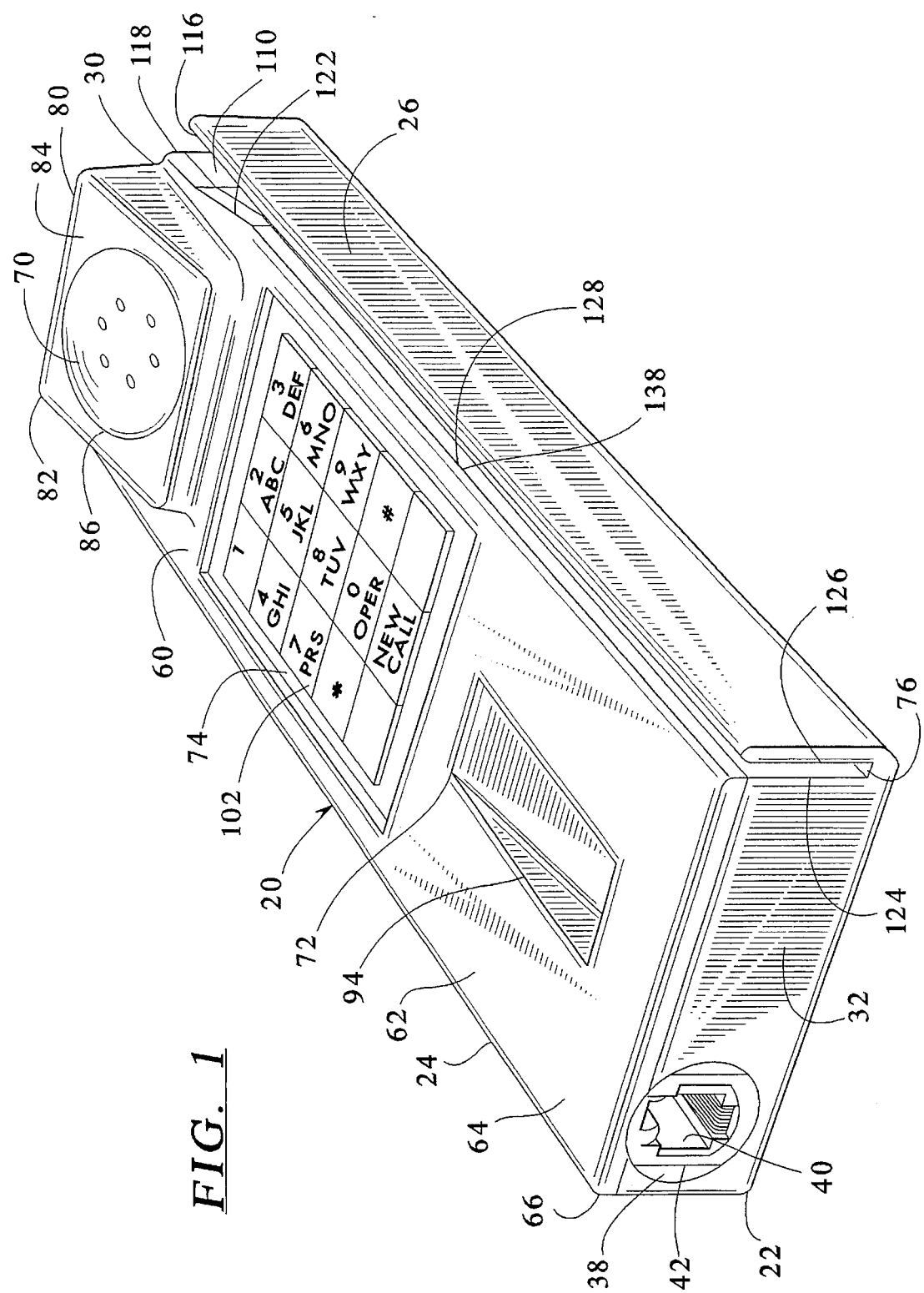
FIG. 1 is a perspective view of a telephone handset in accordance with principles of the present invention.

The earpiece can include a speaker which is connected to a telephone receiving system comprising wires, switches, etc. within the interior of the handset to receive telephone signals from other telephones and unscrambles and converts those signals to recognizable audible tones for the listener's ear. In the embodiment of FIGS. 1 and 2, the earpiece comprises a raised earpiece 70 which extends forwardly of the planar front portion 64 of the front wall 60. The raised earpiece 70 has a substantially rectangular periphery 80 as viewed from the front with rounded corners 82. The raised earpiece 70 has a substantially planar or flat sloping portion or section 84 which extends in a direction upwardly and away from the mouthpiece 72 at an angle of inclination ranging from about 15 to 75 degrees. Positioned on the sloping portion 72, surrounded by the periphery 80, is a concave circular earpiece portion or section 86 with a series of apertures 88 which provides earholes. As shown in FIG. 5, the earpiece 70 can have an inverted U-shaped top portion or section 90 which is positioned flush and in coplanar relationship to the top 30. The top portion 90 can have rounded corners 92.

The mouthpiece can include a microphone which is connected to a telephone transmitting system comprising wires, switches, etc. within the interior of the handset which scrambles and converts the user's voice (words) into electrical impulses or signals and transmits those telephone signals to the receiving telephone via telecommunication equipment. In the embodiment of FIGS. 1 and 2, the mouthpiece comprises a recessed mouthpiece 72 with triangular upright sides 94 and 96. An inclined ramped portion or section provides a lower front-facing ramp 98 which extends between and connects the triangular sides 94 and 96 of the mouthpiece 72. The ramp 98 slopes downwardly in a direction away from the earpiece 70 and towards the bottom 32 of the handset 20 at an angle of inclination ranging from about 15 to 75 degrees. The lower portion of the ramp 98 has three inclined slits 100 which provide mouthpiece holes. More or less, or different shaped mouthpiece holes can also be used. The ramp 98 and triangular sides 94 and 96 of the mouthpiece 72 cooperate with each other to define a recessed opening and chamber which can enhance acoustical transmission of the user's voice and lessen outside noise.

The intermediate control section 74 (FIGS. 1 and 2) of the front wall 60 of the handset 20 has a set, array, or series of finger engagable, telephone activating control keys 102 to enable the user to send (dial) and transmit the desired telephone number. In the embodiment of FIGS. 1 and 2, the manually engagable control keys comprises resilient depressible, alpha numeric, rectangular key pads 104. The interior facing portions of the key pads 104 are electrically connected to a telephone transmission system comprising switches, wires, etc. within the interior of the handset. While the illustrated telephone control keys are preferred, other arrangements, orientation, pattern, number, shapes, or location of the telephone control keys can be used, if desired, and foreign language letters and/or numbers can be used in other countries, if desired.

Figure 8:
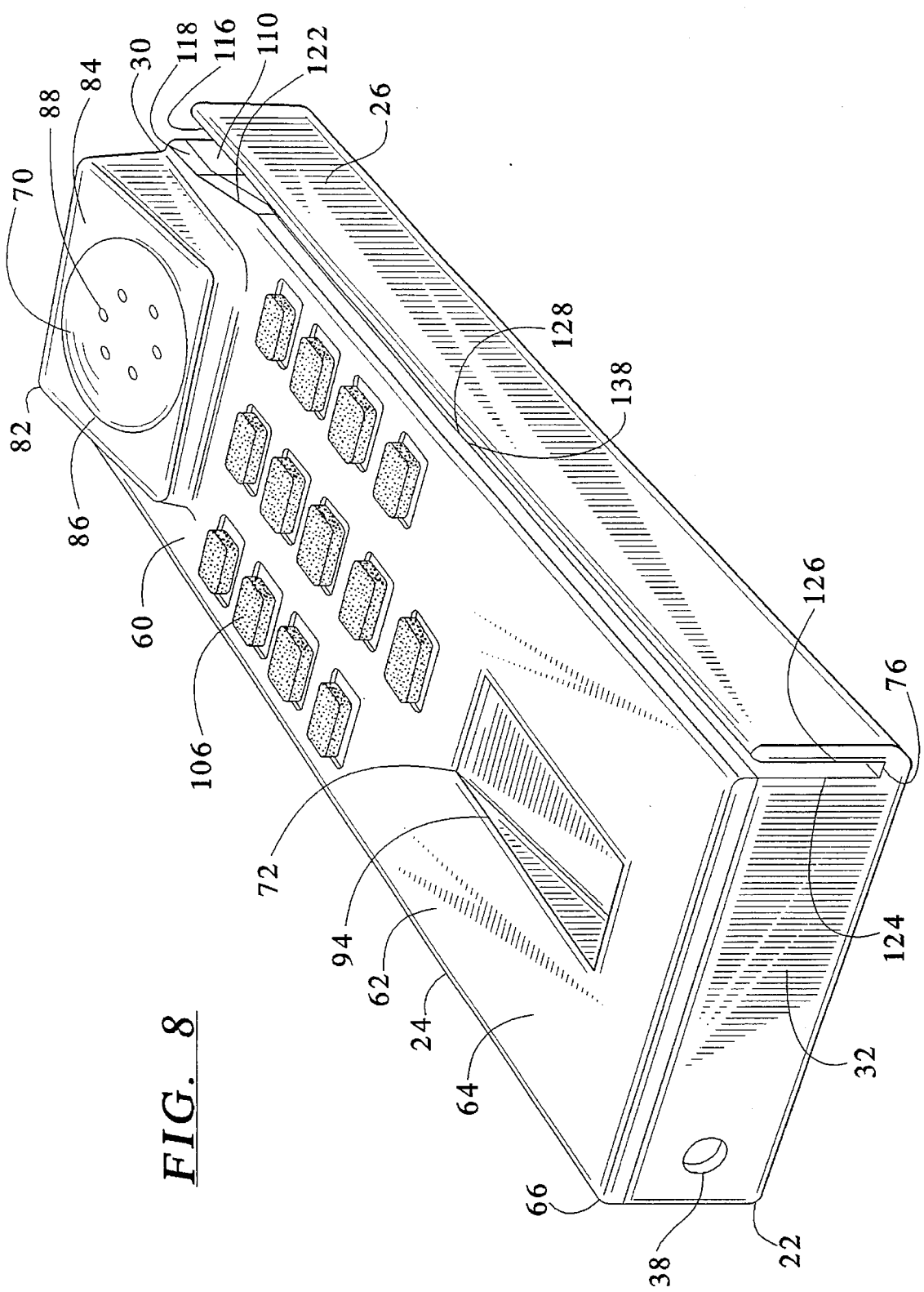
FIG. 8 is a perspective view of a telephone handset with pushbuttons in accordance with principles of the present invention.

Pushbuttons can be used in lieu of key pads for the telephone control keys and/or the computer control keys. The handset 120 of FIG. 8 is structurally and functionally similar to the handset 20 of FIGS. 1–5, except that raised rectangular pushbuttons 106 are used instead of key pads. In some circumstances, it may be desirably to use cylindrical, curved, rounded, or concave pushbuttons, or pushbuttons of other configurations.

The card-receiving slot 76 (FIGS. 1 and 2) is substantially parallel and adjacent the right sidewall 26. As viewed from the front wall 60, the slot extends vertically through the top 30 and bottom 32 of the handset 20. To facilitate entry of the card, the slot 76 has an enlarged card-receiving inlet opening 110 providing a mouth. The specially shaped mouth 110 of the illustrated embodiment also provides a latch receiving-opening to receive and engage a locking latch, such as connected to a handset housing or wall. In the illustrated embodiment, the mouth 110 has a substantially triangular lower section 112 and a rectangular upper section 114. The mouth 110 has a straight outer right side 116 extending along the upper and lower sections 112 and 114. The outer right side 116 communicates with the slot 76 and is positioned contiguous with the slot 76 along the right sidewall 26. The upper rectangular section 114 has an upright inner left side 118 positioned substantially parallel to the right outer side 116. The lower section 112 has a tapered angled left camming side 122 providing a cam or inclined camming surface which diverges and slopes inwardly and upwardly in a direction towards the top 30 of the handset 20 at an angle of inclination ranging from about 15 to 45 degrees relative to the elongated vertical slot 76 as viewed from the front wall 60. The angled side 122 extends between and connects the inner left side 118 to the elongated left wall section 124 of the slot 76. The elongated left wall section 124 is positioned across and parallel to the elongated right wall section 126 of the slot 76.

The telephone handset 20 comprises a credit card station with a card receiving slot structure 76 having an open outer edge 118 which is accessible for receiving a stripe containing portion of a credit card for manually controllable movement of the magnetic stripe along a path defined in the slot structure 76 while the card is still manually gripped by the user. The slot structure 76 includes a pair of spaced apart opposite sidewalls sections 124 and 126. The slot 76 provides a longitudinal path of movement for the credit card. The slot structure 76 can also include a guide provided between the sidewall sections 124 and 126 intermediate the ends. Sensors 138 of an internal magnetic card reader can be positioned in front of the window 128 within the handset 20 for reading the characters on the magnetic stripe of a credit card to enable the calls to be charged when particular characters are present on a credit card and ready by the sensors 138 of the reader.

The slot structure 76 includes an credit card receiving end 110 in which the tapered upper portion 122 of the left sidewall section 124 is inclined and bent away from the right sidewall section 126 to provide a notch to facilitate insertion of the card until the longitudinal edge of the card directly engages the sensor 138 of the card reader. The slot structure 76 can includes an outwardly sloping surface adjacent an opposite, exit end portion of the slot structure which directs the card outwardly of the open edge of the slot structure 76 upon passage of the card beyond the card reader sensor 138 to facilitate withdrawal of the card from the slot 76 by the user.

In the illustrative embodiment, the telephone handset 20 includes an elongated, generally vertically extending slot structure 76 on the right hand side of the front wall 60. The slot structure 76 has an outline or profile which matches the right sidewall 26 of the telephone handset 20. The slot structure 76 is formed by a pair of elongated opposite, spaced apart sidewall sections 124 and 126 made of non-magnetic material such as impact and resistant plastic or stainless steel sheet material. The facing inside surfaces of the left hand and right hand slot structure sidewall sections can be maintained in spaced apart parallel relation by an intermediate guide member also formed of impact-resistant plastic or stainless steel.

The middle or intermediate portion of the slot structure of the left hand sidewall section 124 is formed with a rectangular shaped window 128 so that one or more sensors or sensing elements 138 of a magnetic card reader can read the magnetic characters on the surface of a credit card passing by in front of the window 128 while guided along a prescribed path by the guide rib of the guide slot. The card reader can be housed in the interior of the handset.

At the upper end of the slot structure 76, the left hand sidewall section is angled along surface 122 to diverge outwardly and away from the opposite right hand sidewall section 126 so as to provide a wider open portion 110 at the upper end of the slot structure 76 to facilitate manual insertion of a card into the slot structure 76.

In order to use a credit card, a telephone user grasps the credit card and inserts the lower portion of the credit card containing the magnetic stripe into the slot 76 so as to face the window 128 and sensor 138 of the magnetic card reader, while still gripping the upper portion of the credit card. The user continues to grip the credit card and moves their hand downwardly, all the time pressing the longitudinal edge against an upper guide surface of the guide. This engagement insures that the magnetic stripe of the credit card will move along a generally vertical path, so as to align the magnetic strip to pass directly in front of the card reader window 128 so that the card reader may sequentially read and record the magnetic information contained on the card. When the lower edge of the card first passes the upper edge of the window 128, the card reading process begins to take place and continues until the upper or trailing end of the card moves past the lower edge of the window 128.

After activating the handset with a credit card, the user can operate the telephone and/or computer keys, as desired. The user can also contact the telephone operator by dialing zero (0), or can operate the telphone or use the computer control keys via preauthorized access codes.

Among the many advantages of the novel telephone handset are:
1. Outstanding appeal to businessmen and travelers.
2. Superior performance.
3. Versatile.
4. Reliable.
5. Convenient.
6. Easy to use.
7. Simple to operate.
8. Compact.
9. Economical
10. Safe
11. Efficient
12. Effective Although embodiments of the invention has been shown and described, it is to be understood that various modifications and substitutions, as well as rearrangements of parts, can be made by those skilled in the art without departing from the novel spirit and scope of this invention.

What is claimed is:

1. A telephone handset, comprising:
   a front surface having an earpiece and a mouthpiece;
   a back surface;
   end walls extending between and connecting said front and back surface, said end walls comprising a top and bottom;
   sidewalls extending between and connecting said top and bottom;
   one of said surfaces defining a card-receiving slot;
   said slot having an enlarged inlet opening defining a mouth; and
   said mouth comprises a latch-receiving opening.

2. A telephone handset in accordance with claim 1 wherein said slot is located on said front surface adjacent one of said sidewalls.

3. A telephone handset, comprising:
   substantially planar imperforate sidewalls including a left sidewall and a right sidewall, said sidewalls being substantially parallel and rectangular with rounded corners;
   substantially planar and parallel end walls extending transversely between and connecting said sidewalls, said end walls including a substantially imperforate top wall providing a top and a bottom wall providing a bottom, said end walls being substantially rectangular with rounded corners, and said bottom wall defining a cord-receiving opening in proximity to one of said said sidewalls and providing a socket;
   a back surface providing a back extending between and connecting said end walls and said sidewalls, said back surface having a substantially planar back portion and being substantially rectangular with rounded corners, and said back having an array of finger engagable keys;
   a front surface providing a front extending between and connecting said end walls and said sidewalls, said front surface having substantially planar front portions positioned substantially parallel to said planar back portions of said back, said front having an earpiece adjacent said top, a mouthpiece in proximity to said bottom, an intermediate control section positioned between said earpiece and said mouthpiece, said intermediate control section having a set of telephone activating control keys facing opposite said finger engagable keys, and said front defining a substantially vertical elongated card-receiving slot extending through said end walls, said slot being substantially parallel and disposed adjacent another one of said sidewalls, said slot having an enlarged card-receiving inlet opening providing a mouth with a substantially triangular lower section and a substantially rectangular upper section, said mouth having a substantially straight outer side disposed substantially contiguous to said slot along said adjacent sidewall, an upright inner side along said upper section positioned substantially parallel to said outer side, and a tapered angled side providing a cam surface along said lower section diverging inwardly and upwardly;
   said telephone activating control keys selected from the group consisting of resilient depressible key pads and pushbuttons;
   said earpiece comprising a raised earpiece extending forwardly of said planar front portions, said raised earpiece having a substantially rectangular periphery as viewed from the front with rounded corner, said earpiece having a substantially planar sloping portion extending upwardly away from said mouth-piece at an angle of inclination ranging from about 15 degrees to about 75 degrees with a substantially circular earpiece portion defining a series of apertures providing ear holes surrounded by said rectangular periphery, and said raised earpiece having an inverted U-shaped top portion positioned flush and in substantial coplanar relationship with said top wall and having rounded corners; and
   said mouthpiece comprising a recessed mouthpiece with triangular upright sides and having an inclined ramped portion providing a ramp extending between and connecting said triangular sides, and said ramp sloping downwardly and away from said earpiece towards said bottom at an angle of inclination ranging from about 15 degrees to about 75 degrees and defining upright slits providing mouthpiece holes.

4. A telephone handset in accordance with claim 3 wherein said mouth comprises a latch receiving-opening.

5. A telephone handset in accordance with claim 3 wherein said telephone activating control keys comprise alpha numeric key pads.

6. A telephone handset in accordance with claim 5 wherein said finger engagable keys comprise three columns of key pads, said key pads in each of said columns being sequentially and progressively arranged in increasing order from top to bottom.

7. A telephone handset in accordance with claim 6 wherein said finger engagable keys further comprise at least one arrow cursor key.

8. A telephone handset in accordance with claim 3 wherein said finger engagable keys comprise a set of pushbuttons.

9. A telephone handset in accordance with claim 3 wherein said finger engagable keys comprise columns of alpha key pads.

\* \* \* \* \*